(12) United States Patent
Wang et al.

(10) Patent No.: US 12,078,919 B2
(45) Date of Patent: Sep. 3, 2024

(54) WIRE GRID STRUCTURE AND MANUFACTURING METHOD THEREFOR, AND PROJECTION SCREEN

(71) Applicant: APPOTRONICS CORPORATION LIMITED, Guangdong (CN)

(72) Inventors: Jie Wang, Guangdong (CN); Hongxiu Zhang, Guangdong (CN); Wei Sun, Guangdong (CN); Lin Wang, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 216 days.

(21) Appl. No.: 17/436,457

(22) PCT Filed: Feb. 26, 2020

(86) PCT No.: PCT/CN2020/076765
§ 371 (c)(1),
(2) Date: Sep. 3, 2021

(87) PCT Pub. No.: WO2020/177590
PCT Pub. Date: Sep. 10, 2020

(65) Prior Publication Data
US 2022/0155667 A1    May 19, 2022

(30) Foreign Application Priority Data
Mar. 4, 2019    (CN) .................... 201910161117.0

(51) Int. Cl.
*G03B 21/60*    (2014.01)
*B29C 48/00*    (2019.01)
(Continued)

(52) U.S. Cl.
CPC .......... *G03B 21/60* (2013.01); *B29C 48/0018* (2019.02); *B29C 48/002* (2019.02);
(Continued)

(58) Field of Classification Search
CPC ............................. G03B 21/60; G02B 5/0242
See application file for complete search history.

(56) References Cited

U.S. PATENT DOCUMENTS

2016/0334697 A1* 11/2016 Kim ........................ G02B 3/08
2019/0346757 A1* 11/2019 Su ........................ G02B 6/0025

FOREIGN PATENT DOCUMENTS

| CN | 1670618 | | 9/2005 | |
| CN | 1773371 A | * | 5/2006 | .............. G03B 21/56 |

(Continued)

OTHER PUBLICATIONS

International Search Report for International Application PCT/CN2020/076765, mailed May 12, 2020.

*Primary Examiner* — Christopher E Mahoney
(74) *Attorney, Agent, or Firm* — Burris Law, PLLC

(57) ABSTRACT

A wire grid structure and a manufacturing method therefor, and a projection screen are provided. The manufacturing method includes: extruding a molten mixed material body in a melt extruder to a casting roll to form a casting piece; patterning the casting piece by means of an impression roll to form a precursor having a preset wire grid structure pattern, where the precursor is wound on the impression roll and has a first dimension in a height direction; stretching the precursor by a first group of stretching rolls and a second group of stretching rolls in two opposite directions along a direction perpendicular to the height direction to form the wire grid structure, a preset distance being configured between the first group of stretching rolls and the second group of stretching rolls. The wire grid structure has a (Continued)

second dimension in the height direction that is greater than the second dimension.

14 Claims, 6 Drawing Sheets

(51) Int. Cl.
*B29C 59/04* (2006.01)
*G02B 5/02* (2006.01)
*B29K 105/16* (2006.01)
*B29L 31/00* (2006.01)

(52) U.S. Cl.
CPC ............ *B29C 59/04* (2013.01); *G02B 5/0242* (2013.01); *G02B 5/0268* (2013.01); *G02B 5/0284* (2013.01); *B29K 2105/16* (2013.01); *B29K 2995/003* (2013.01); *B29L 2031/737* (2013.01)

(56) References Cited

FOREIGN PATENT DOCUMENTS

| | | | | |
|---|---|---|---|---|
| CN | 1834756 | 9/2006 | | |
| CN | 101103284 | 1/2008 | | |
| CN | 101512398 | 8/2009 | | |
| CN | 101602254 | 12/2009 | | |
| CN | 104460213 | 3/2015 | | |
| CN | 106226988 | 12/2016 | | |
| CN | 206292519 | 6/2017 | | |
| CN | 108153102 | 6/2018 | | |
| CN | 208126098 | 11/2018 | | |
| EP | 0599272 | 6/1994 | | |
| GB | 2537192 A | * | 10/2016 | ............ G03B 21/56 |
| JP | 2017026759 | 2/2017 | | |
| KR | 101811427 B1 | * | 1/2018 | ............ G03B 21/60 |
| WO | WO-03077026 A1 | * | 9/2003 | ............ G03B 21/60 |

* cited by examiner

WIRE GRID STRUCTURE AND MANUFACTURING METHOD THEREFOR, AND PROJECTION SCREEN

CROSS-REFERENCE TO RELATED APPLICATIONS

This application is a national stage application of International Application No. PCT/CN2020/076765, filed on Feb. 26, 2020, which claims priority to and the benefit of CN 201910161117.0, filed on Mar. 4, 2019. The disclosures of the above applications are incorporated herein by reference.

FIELD

The present disclosure relates to the field of projection technologies, and in particular, to a wire grid structure and a manufacturing method therefor, and a projection screen.

BACKGROUND

The statements in this section merely provide background information related to the present disclosure and may not constitute prior art.

A projection screen includes a wire grid structure. The wire grid structure includes a wire grid body, and the wire grid body has a relatively small height. During manufacturing process of the wire grid structure, a cast piece is usually patterned to form the required wire grid structure. Because the wire grid body in the wire grid structure has a relatively small height, the cast piece for manufacturing the wire grid structure also has a relatively small height. Consequently, the cast piece can be crushed and damaged during the patterning process, leading to a relatively low yield in the patterning process of the cast piece and a relatively low yield of the wire grid structure.

SUMMARY

This section provides a general summary of the disclosure and is not a comprehensive disclosure of its full scope or all of its features.

An objective of the present disclosure is to provide a wire grid structure and a manufacturing method therefor, and a projection screen, to resolve technical problems of a relatively low yield in a patterning process of a cast piece and a relatively low yield of a wire grid structure that are caused by possible crushing and damaging of the cast piece during the patterning process due to a relatively small height of the cast piece for manufacturing the wire grid structure.

The present disclosure provides a wire grid structure. The wire grid structure includes a wire grid structure body and reflective particle additives, and the reflective particle additives are provided on a surface of the grid structure body and/or are provided in an interior of the wire grid structure body.

The present disclosure provides a projection screen. The projection screen includes a reflective layer, an absorbing layer, and the foregoing wire grid structure. The wire grid structure body includes a body surface, and a projection surface and a non-projection surface that are alternately arranged and opposite to the body surface, the projection surface is configured to reflect projection light, the absorbing layer is provided on the non-projection surface, and the reflective layer is provided on the body surface.

The present disclosure provides a manufacturing method for a wire grid structure, including:

extruding a molten mixed material body from a melt extruder to a cast-piece roll to form a cast piece;

patterning, by an impression roll, the cast piece to form a precursor with a preset wire grid structure pattern, where the precursor is wound on the impression roll, and the precursor has a first dimension in a height direction; and stretching, by a first group of stretching rolls and a second group of stretching rolls that are spaced a preset distance, the precursor in two opposite directions along a direction perpendicular to the height direction to form a wire grid structure, wherein the wire grid structure has a second dimension in the height direction, and the first dimension is larger than the second dimension.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art can still derive other drawings from these accompanying drawings without creative efforts.

Figure 1:
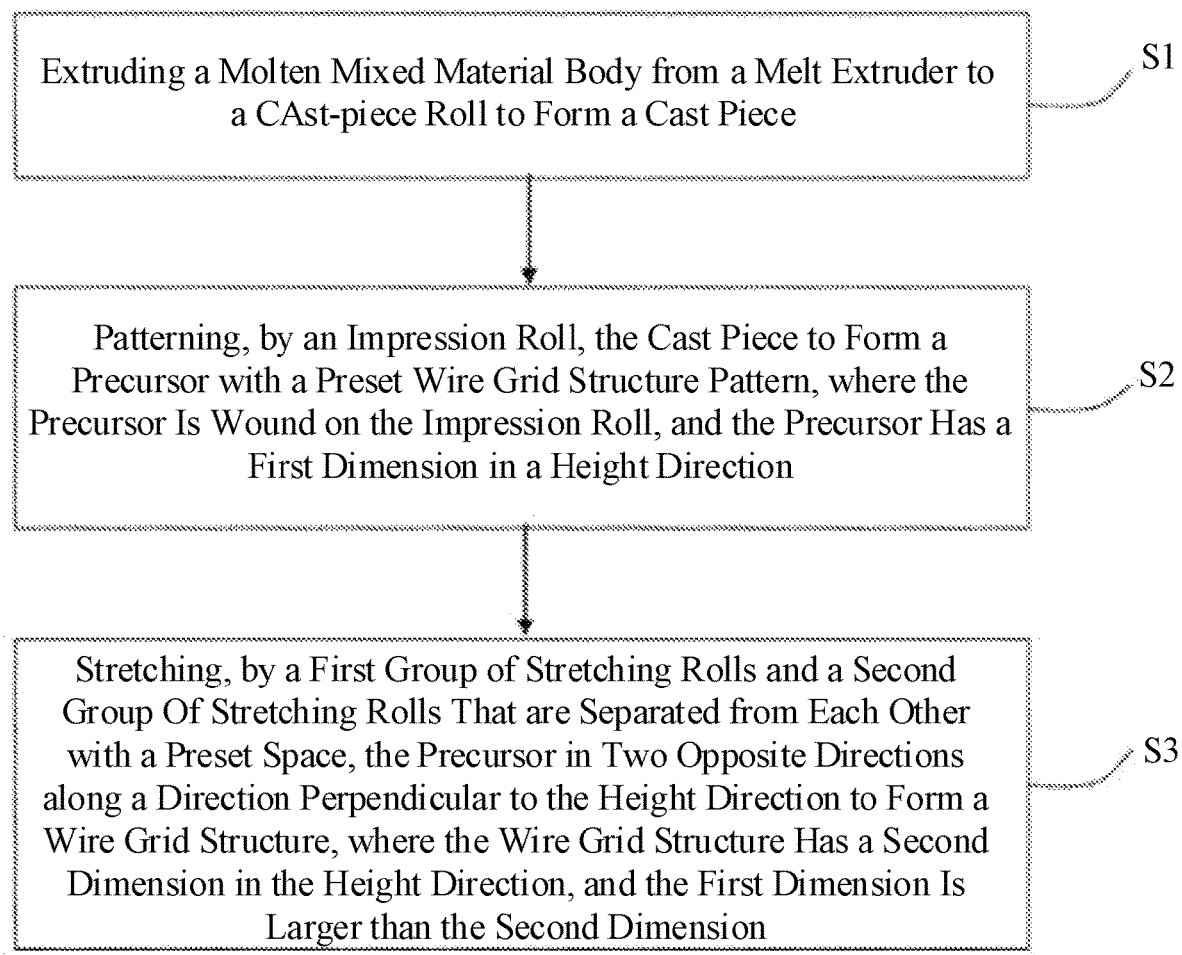
FIG. 1 is a schematic flowchart of a manufacturing method for a wire grid structure according to an embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 2:
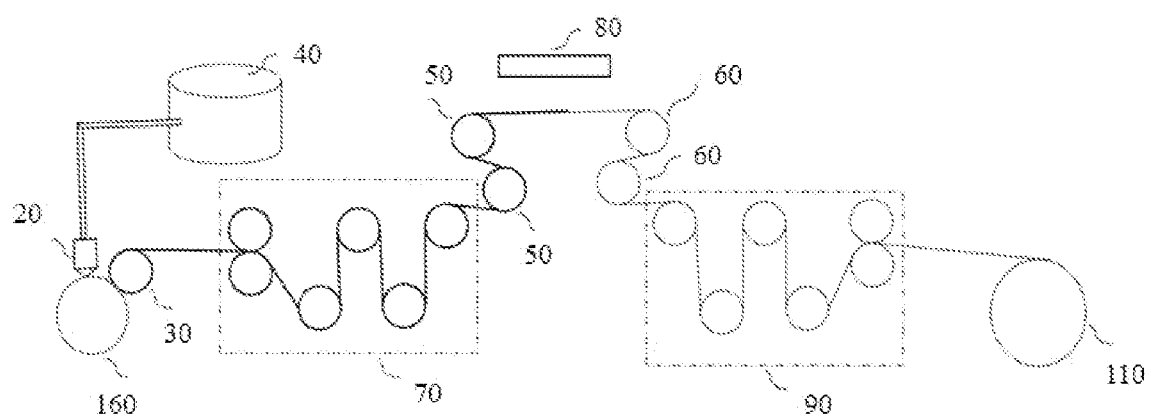
FIG. 2 is a schematic diagram of an apparatus for manufacturing the wire grid structure shown in FIG. 1.

Referring to FIG. 1 and FIG. 2, the present disclosure provides a manufacturing method for a wire grid structure, and the manufacturing method includes following steps.

Figure 3:
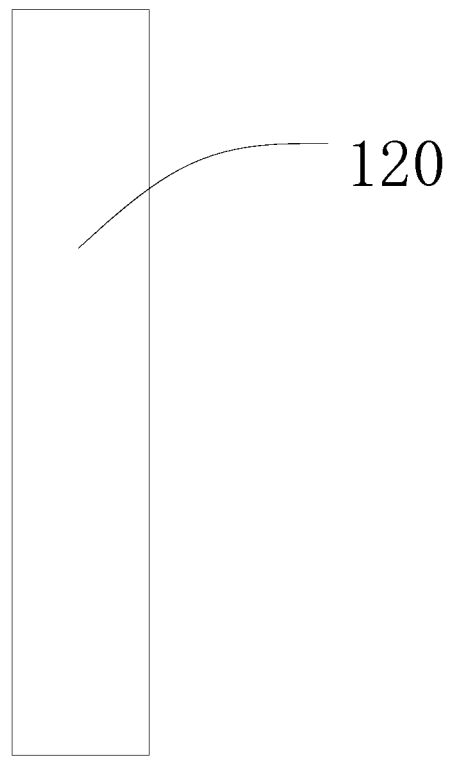
FIG. 3 is a schematic diagram of a cast piece manufactured in step S1 in FIG. 1.

At step S1, referring to FIG. 3, a molten mixed material body extruded from a melt extruder is extruded to a cast-piece roll 160 to form a cast piece 120. In this step, the cast piece 120 has a relatively large thickness. The mixed material body is made of an organic material and an inorganic material. The organic material includes polyethylene terephthalate (PET) chips with a mass fraction of 40%-70%, isophthalic acid with a mass fraction of 5%-10%, cyclohexanedimethanol with a mass fraction of 5%-10%, and polyethylene glycol with a mass fraction of 5%-10%. The inorganic material includes reflective particle additives with a mass fraction of 10%-20%. Specifically, the foregoing mixed material is added to a dryer 40 to be dried and uniformly mixed, and the dried mixed material is sent to the melt extruder to be melt, to obtain a molten mixed material body. The molten mixed material body is extruded to the cast-piece roll 160 through a die head of the melt extruder. The cast-piece roll 160 is a cooling roll, so as to cool and solidify the molten mixed material body into the desired cast piece 120. During the drying process, a temperature needs to be raised to a first preset temperature range, and the first preset temperature range is from 170° to 180°. During the melting process, the temperature needs to be raised to a second preset temperature range, and the second preset temperature range is from 270° to 290°. Each material in the molten mixed material body has a preset ratio. The chips can alternatively be polycarbonate (PC), polyvinyl chloride (PVC), polypropylene (PP), polyethylene (PE), polymethylmethacrylate (PMMA), and the like.

In a specific embodiment, the mixed material of the cast piece 120 includes terephthalic acid with a mass fraction of 32.5%, hexanediol with a mass fraction of 32.5%, isophthalic acid with a mass fraction of 8%, cyclohexanedimethanol with a mass fraction of 5%, polyethylene glycol with a mass fraction of 5%, and reflective particle additive with a mass fraction of 17%. The mixed material is added to the dryer 40, mixed and dried for three hours at a first preset temperature, and then the dried material is transferred to the melt extruder, melted, plasticized and mixed again at a second preset temperature. The molten mixed material body is extruded to the cast-piece roll 160 through the die head of the melt extruder after being metered and filtered, to form the cast piece 120. In this embodiment, the reflective particle additive can be titanium dioxide (titanium dioxide).

Figure 4:
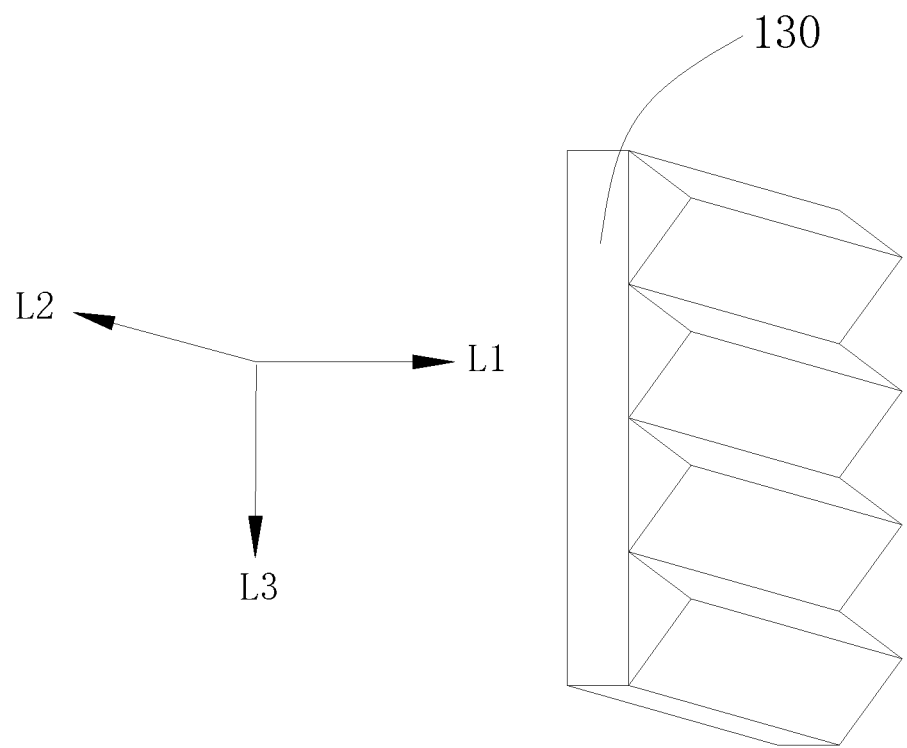
FIG. 4 is a schematic diagram of a precursor manufactured at step S2 in FIG. 1.
Figure 5:
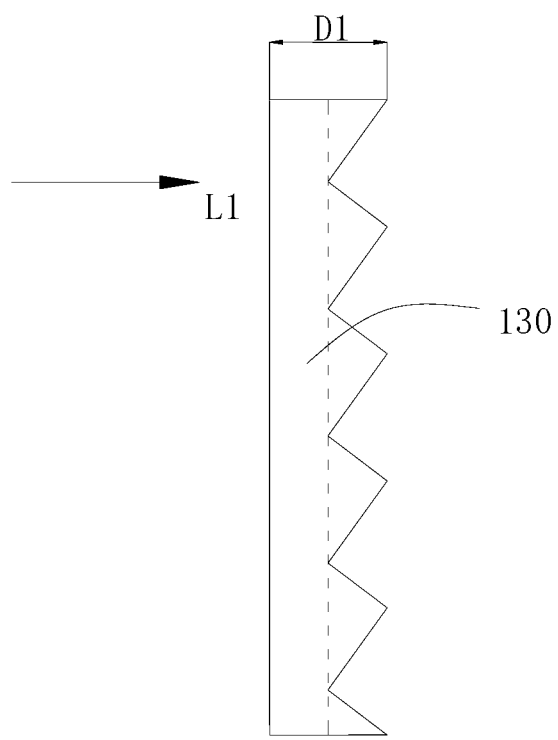
FIG. 5 is a schematic side view of a precursor manufactured at step S2 in FIG. 1.

At the step S2, referring to FIG. 4 and FIG. 5, an impression roll 30 patterns the cast piece 120 to form a precursor 130 with a preset wire grid structure pattern. The precursor 130 is wound on the impression roll 30, and the precursor 130 has a first dimension D1 in a height direction L1. It can be learned from step S1 that, the cast piece 120 is relatively thick. In other words, the first dimension D1 of the cast piece 120 in the height direction L1 is relatively large.

In this step, the precursor 130 formed by patterning the cast piece 120 also has a relatively large first dimension D1 in the height direction L1.

Figure 6:
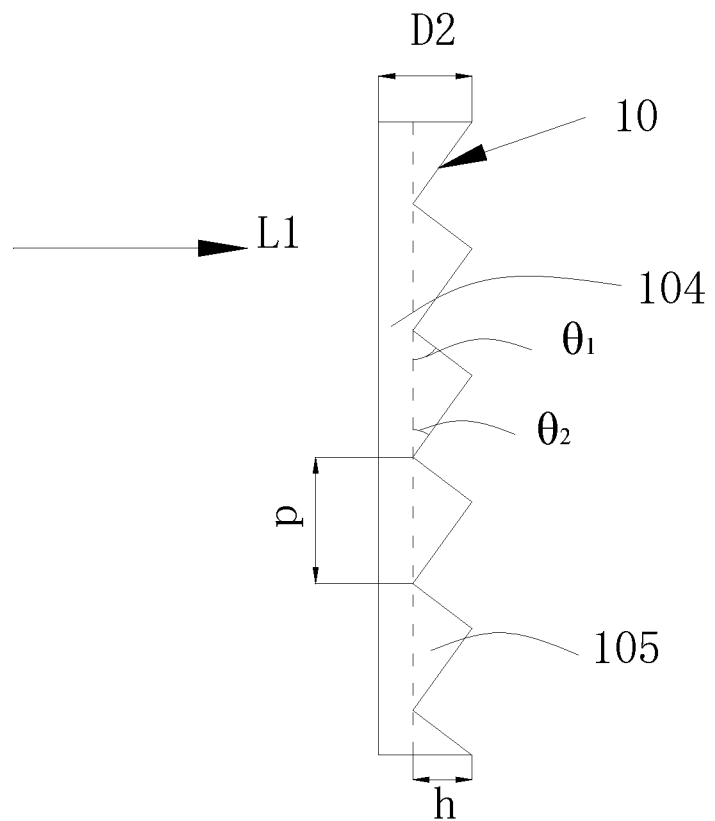
FIG. 6 is a schematic diagram of a wire grid structure manufactured at step S3 in FIG. 1.

At the step S3, referring to FIG. 6, a first group of stretching rolls 50 and a second group of stretching rolls 60 that are separated from each other with a preset space stretch the precursor 130 in two opposite directions along a direction L2 perpendicular to the height direction L1 to form the wire grid structure 10. The wire grid structure 10 has a second dimension D2 in the height direction L1, the first dimension D1 is larger than the second dimension D2, and a ratio of the first dimension D1 to the second dimension D2 is within a first preset value range. The first preset value range is from 1 to 6. In a specific embodiment, the ratio of the first dimension D1 to the second dimension D2 is 6.

Therefore, in this application, the cast piece 120 that has a relatively large dimension in the height direction L1 is patterned to manufacture the precursor 130 that has a relatively large dimension in the height direction L1, to reduce difficulty of patterning the cast piece 120, thereby improving a patterning yield of the cast piece 120, and improving a yield of the wire grid structure 10.

A conventional manufacturing method for the wire grid structure 10 can alternatively be: mixing the molten mixed material and extruding the molten mixed material body to form the cast piece 120, stretching the cast piece 120, and patterning the stretched cast piece 120 to obtain the wire grid structure 10. The conventional manufacturing method for the wire grid structure 10 is mainly to stretch the cast piece 120 first and then pattern the cast piece 120. Because the cast piece 120 is relatively thin after being stretched first, the cast piece 120 is easily damaged and scrapped in the patterning process. Consequently, the patterning yield of the cast piece 120 is relatively low, and the yield of the wire grid structure 10 is relatively low.

In this application, the cast piece 120 is patterned first to form the precursor 130 that has a relatively large dimension in the height direction L1, and then the precursor 130 is stretched. In this way, the patterning process of the cast piece 120 is simple and easy because of the relatively large dimension in the height direction L1 of the cast piece 120, thereby improving the product yield. In other words, this application is equivalent to magnifying the dimension of the conventional cast piece 120 in the height direction L1 first, and then patterning the cast piece 120. The patterning process is simple because it is performed on a relatively thick cast piece 120. Therefore, this application further resolves the technical problems of easy damaging and scrapping of the conventional cast piece 120 during the patterning process of the cast piece 120, a relatively low patterning yield of the cast piece 120, and a relatively low yield of the wire grid structure 10.

Further, because the conventional cast piece 120 has a relatively small dimension in the height direction L1 after being stretched, during the patterning process, a precision device with relatively low hardness is required to pattern the cast piece 120, resulting in relatively high manufacturing costs of the wire grid structure 10. In addition, because the wire grid structure 10 is moulded by using UV glue, the wire grid structure 10 is easily blocked due to poor demoulding of the UV glue, resulting in scrapping of the precision device. In this application, the relatively thick cast piece 120 is patterned to form the precursor 130, and then the precursor 130 is stretched to obtain the desired wire grid structure 10. Therefore, during the patterning process, there is no need to impose a high requirement on the impression roll 30 for patterning the cast piece 120, and there is no need to use a precision device with relatively low hardness to pattern the cast piece 120. An impression roll 30 with a hardness value greater than a preset hardness value can be used to pattern the cast piece 120. Therefore, the manufacturing costs of the wire grid structure 10 are relatively low. In this way, this application further resolves a technical problem of relatively high manufacturing costs of the wire grid structure 10 due to use of a precision device in the conventional patterning process. In a specific embodiment of this application, an impression roll 30 with a chrome-plated stainless steel surface can be used.

For the step S3, the preset space between the first group of stretching rolls 50 and the second group of stretching rolls 60 is relatively small. This can ensure that the wire grid structure 10 is not deformed in the height direction L1. However, the preset space between the first group of stretching rolls 50 and the second group of stretching rolls 60 should not be too small. If the preset spacing is too small, the precursor 130 is stretched at a low speed. In a specific embodiment, the preset space between the first group of stretching rolls 50 and the second group of stretching rolls 60 can range from 0.1 m to 0.5 m. In some embodiments, the preset space is 0.2 m.

The first group of stretching rolls 50 and the second group of stretching rolls 60 can all be rollers. The first group of stretching rolls 50 rotate at a first rotational speed to stretch the precursor 130. The second group of stretching rolls 60 rotate at a second rotational speed to stretch the precursor 130. A ratio of the first rotational speed to the second rotational speed is within a second preset value range. The second preset value range is from 1 to 6. In a specific embodiment, the rotational speed of the first group of stretching rolls 50 can be set to 6 m/min, and the rotational speed of the second group of stretching rolls 60 can be set to 1 m/min. The precursor 130 is longitudinally stretched by a difference between the rotational speeds of the first group of stretching rolls 50 and the second group of stretching rolls 60. In some embodiments, the ratio does not exceed 6. In specific practice, the ratio of the first rotational speed of the first group of stretching rolls 50 to the second rotational speed of the second group of stretching rolls 60 can be adjusted according to the specific first dimension D1 in the height direction L1 of the precursor 130, to obtain the desired wire grid structure 10. For example, when the ratio of the first dimension D1 to the second dimension D2 is 6, the ratio of the first rotational speed to the second rotational speed can also be 6. For example, when the ratio of the first dimension D1 to the second dimension D2 is 3, the ratio of the first rotational speed to the second rotational speed can also be 3.

The precursor 130 needs to be heated before being stretched, to increase flexibility of the precursor 130. It can be learned from the foregoing discussion that the main material of the precursor 130 is an organic substance, and flexibility of the organic substance increases when the temperature is raised, so as to facilitate stretching in a subsequent process. Specifically, the precursor 130 is fed into a multi-roll heating apparatus 70 before being stretched, and the precursor 130 is heated in a third preset temperature range in a stepped manner, to prevent the precursor 130 from being deformed due to an excessively rapid increase in a temperature. The third preset temperature range is from 80° to 120°.

During the stretching process of the precursor 130 by the first group of stretching rolls 50 and the second group of stretching rolls 60, the precursor 130 further needs to maintain a relatively high temperature to ensure flexibility.

In this application, an infrared heating apparatus 80 is used to heat the precursor 130, so that the precursor 130 maintains favorable flexibility. The infrared heating apparatus 80 heats the precursor 130 in a fourth preset temperature range. The fourth preset temperature range is from 100° to 150°.

The wire grid structure 10 further needs to be cooled after being manufactured. In some embodiments, the wire grid structure 10 is cooled on a cooling roll 90 with a stepped cooling method, to prevent the wire grid structure 10 from being deformed due to excessively rapid cooling. The wire grid structure 10 is cooled in a fifth preset temperature range. The fifth preset temperature range is from 20° to 50°.

Figure 9:
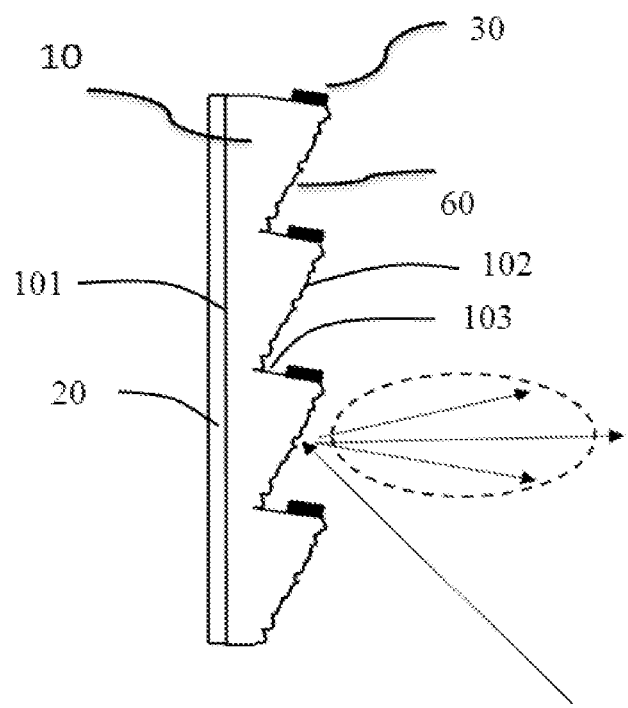
FIG. 9 is a schematic diagram of a projection screen manufactured in the present disclosure.

Referring to FIG. 9, after the wire grid structure 10 is cooled, a reflective layer 20 can be coated on a non-patterned side of the wire grid structure 10, and an absorbing layer 30 is overlaid on a non-projection surface 103, having a pattern of the wire grid structure 10 to form a projection screen 100.

The projection screen 100 is wound up after being manufactured. The winding process is performed through a roll-to-roll process on a winding shaft 110. The roll-to-roll process is suitable for mass production of projection screens 100, and has higher productivity and a better yield than signal sheet production.

Still referring to FIG. 6 to FIG. 9, the present disclosure further provides a projection screen 100, and the projection screen 100 includes a reflective layer 20, an absorbing layer 30 and the foregoing wire grid structure 10. The wire grid structure 10 includes a wire grid structure body 104 and a reflective particle additive 170. The reflective particle additive 170 is provided on a surface of the grid structure body 104 and/or provided inside the wire grid structure body 104. The wire grid structure body 104 includes a body surface 101, and a projection surface 102 and a non-projection surface 103 that are alternately arranged and opposite to the body surface 101. The projection surface 102 is configured to reflect projection light. The absorbing layer 30 is provided on the non-projection surface 103. The reflective layer 20 is provided on the body surface 101. The absorbing layer 30 is a black absorbing layer. A surface of the reflective particle additive 170 is a curved surface.

Figure 7:
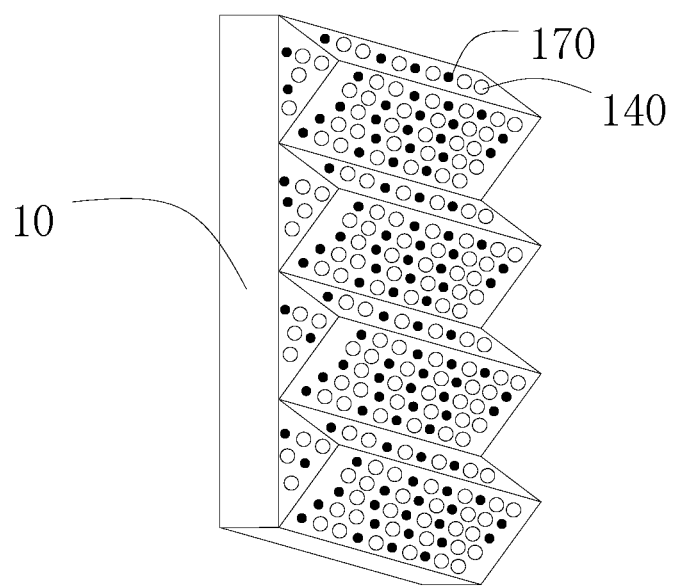
FIG. 7 is a schematic diagram of a wire grid structure manufactured in the present disclosure.
Figure 8:
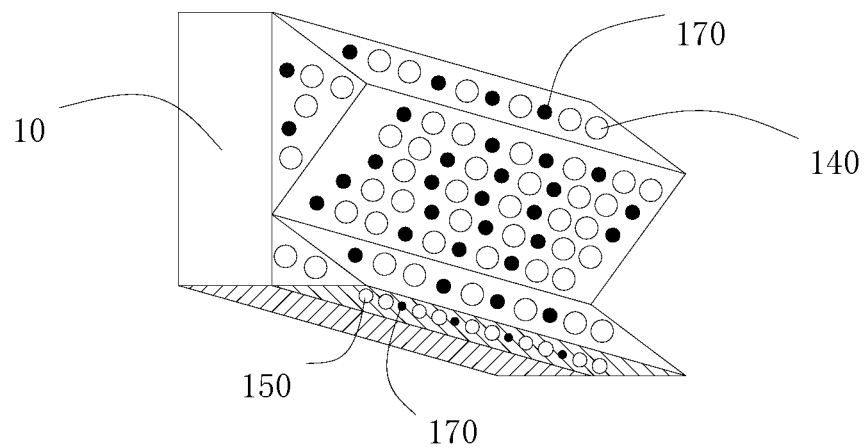
FIG. 8 is a schematic cross-sectional diagram of the wire grid structure shown in FIG. 7.
Figure 10:
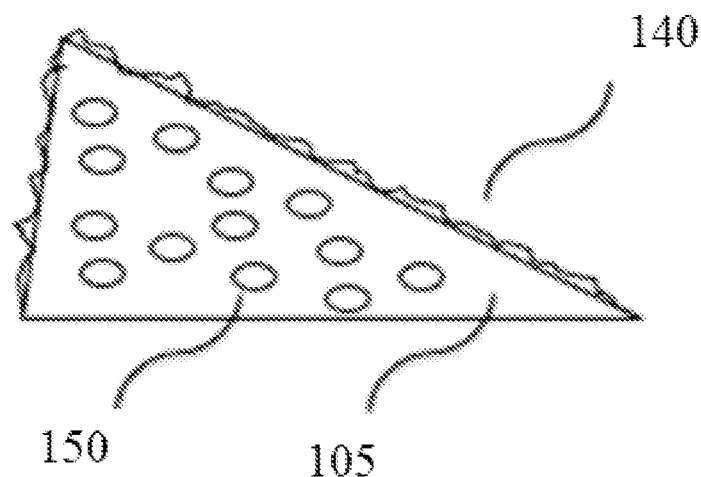
FIG. 10 is a schematic diagram of a wire grid body of the wire grid structure manufactured in FIG. 6.

Referring to FIG. 7, FIG. 8, and FIG. 10, the wire grid structure 10 is manufactured by using the foregoing manufacturing method for the wire grid structure 10. It can be learned from the foregoing manufacturing method for the wire grid structure 10 that, the reflective particle additive 170 is added to a raw material for manufacturing the wire grid structure 10, and during the stretching process of the precursor 130, the precursor 130 is stretched while the reflective particle additive 170 is not stretched. Therefore, microgrooves 140 are formed on a surface of the wire grid structure 10, and air holes 150 are formed inside the wire grid structure 10. The microgrooves 140 are microstructures formed on the surface of the wire grid structure 10. The existence of the microgrooves 140 makes the surface of the wire grid structure 10 a rough surface.

Specifically, because the first group of stretching rolls 50 and the second group of stretching rolls 60 stretch the precursor 130 in two opposite directions, the microgrooves 140 on the surface of the wire grid structure 10 are formed in the stretching direction and on two sides of the reflective particle additive 170. At least one microgroove 140 formed on each of the two sides of the reflective particle additive 170, and when a stretching force changes, one of the microgrooves 140 can rupture into a plurality of microgrooves 140, so that the number of the microgrooves 140 is at least twice the number of the reflective particle additive 170.

Similarly, the air holes 150 inside the wire grid structure 10 are formed in the stretching direction and on the two sides of the reflective particle additive. At least one air hole 150 formed on each of the two sides of the reflective particle additive 170, and when the stretching force changes, one air hole 150 can rupture to into a plurality of air holes 150, so that the number of the air holes 150 is at least twice the number of the reflective particle additives.

Therefore, for the surface of the wire grid structure 10, because the surface of the reflective particle additive 170 is a curved surface, the curved-surface reflective particle additive 170 can also diffuse reflected incident light, and because the surface of the microgroove 140 is also a curved surface, the curved-surface microgroove 140 can also diffuse incident light irradiated onto the microgroove 140. In this way, a viewing angle and a brightness gain of the projection screen 100 are increased.

For the inside of the wire grid structure 10, similarly, the curved-surface reflective particle additive 170 can also diffuse the reflected incident light, and because a hole wall an air hole 150 is also curved, the curved hole wall can also diffuse incident light irradiated onto the air holes 150. In this way, the viewing angle and the brightness gain of the projection screen 100 are increased.

Further, because both the inside and the surface of the wire grid structure 10 are provided with reflective particle additives 170, the reflective particle additives 170 can reflect incident light. In this way, a relatively small amount of light enters the projection screen and passes through the projection screen, while a large amount of light is reflected and enters the view sight of a viewer, so that the reflective particle additive 170 further improves reflectivity of the projection screen.

Therefore, the reflective particle additives 170 on the wire grid structure 10 can reflect and diffuse the incident light, which not only increases the reflectivity of the projection screen 100, but also increases the viewing angle and the brightness gain of the projection screen 100. The air holes 150 and the microgrooves 140 on the wire grid structure 10 can scatter light irradiated onto the projection screen 100, which also increases the viewing angle and the brightness gain of the projection screen 100.

In a specific embodiment, the reflective particle additive 170 includes barium sulfate, titanium dioxide or calcium carbonate. In some embodiments, the reflective particle additive 170 undergoes coupling treatment. Coupling treatment is to perform modification treatment on a surface of an inorganic material to increase adhesion between an inorganic substance and an organic substance. The inorganic substance herein is at least one of the aforementioned barium sulfate, titanium dioxide, or calcium carbonate. The organic substance is at least one of the aforementioned PET, polyester PC, PVC, PP, PE, or PMMA.

Still referring to FIG. 6, the wire grid structure 10 manufactured in this application is shown in the following figure. The wire grid structure 10 includes wire grid bodies 105 connected in sequence. The second dimension D2 of the wire grid structure 10 in the height direction L1 ranges from 50 μm to 500 μm, and the dimension of the wire grid body 105 in the height direction L1 is within 0 μm to 200 μm.

In a specific wire grid structure 10, each wire grid body 105 includes two bottom angles $\theta_1$ and $\theta_2$. The angle θ1 is 89°, the angle $\theta_2$ falls within a range of 1°-10°, and the angle $\theta_2$ changes gradually. A dimension h of the wire grid body 105 in the height direction L1 changes gradually with the angle $\theta_2$. The dimension h of the wire grid body 105 in the height direction L1 falls within a range of 5 μm to 53 μm. A dimension p of each wire grid body 105 in a direction perpendicular to the height direction is 300 μm.

Figure 11:
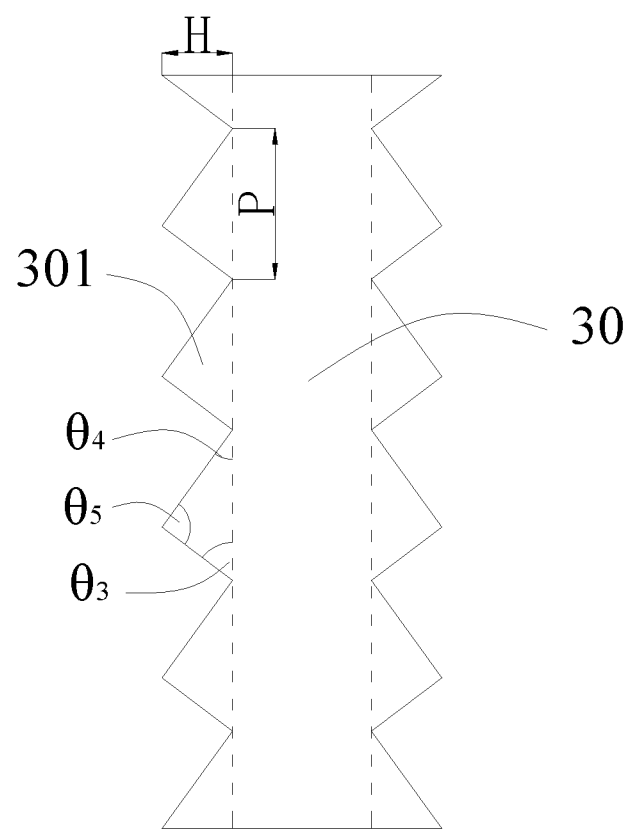
FIG. 11 is a schematic diagram of an impression roll in FIG. 2.

Referring to FIG. 11, a structure of the impression roll 30 is designed as follows:

To ensure an angle of the wire grid structure 10 after stretching, the impression roll 30 needs to be designed to have a structure matching the wire grid structure 10, an outer surface of the impression roll 30 needs to be designed to have serrated protrusions 301, vertexes of vertical angles $\theta_5$ of all the protrusions 301 of the impression roll 30 need to be located on a same vertical line, one bottom angle $\theta_3$ of each protrusion 301 of the impression roll 30 corresponds to the bottom angle $\theta_1$ of the wire grid body 105, the other bottom angle $\theta_4$ of the impression roll 30 corresponds to the bottom angle $\theta_2$ of the wire grid body 105, and the angle $\theta_4$ can be a fixed angle, such as 89.8333°.

Calculation is performed according to a trigonometric function formula:

If an initial height H of the impression roll 30 is 30 μm, $\theta_1$ of the wire grid body 105 is 1°, and the bottom angle $\theta_3$ of the protrusion 301 corresponding to the impression roll 30 is 5.9788°. If the height H of the impression roll 30 after gradually changing is 318 μm, the bottom angle $\theta_1$ of the wire grid body 105 is 10°, and the bottom angle $\theta_3$ of the protrusion 301 corresponding to the impression roll 30 is 46.6133°. In other words, one bottom angle $\theta_3$ of the protrusion 301 falls within a range of 5.9788°-46.6133°, the other bottom angle $\theta_4$ is 89.8333°, the height H falls within a range of 30 μm-318 μm, and a dimension P in the direction perpendicular to the height direction is 300 μm.

The above disclosed is only some embodiments of the present disclosure, and definitely should not be used to limit the scope of the claims of the present disclosure. A person of ordinary skill in the art can understand all or some of the procedures for implementing the foregoing embodiments and make equivalent modification according to the claims of the present disclosure. The equivalent modifications still fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A wire grid structure, comprising a wire grid structure body and reflective particle additives, wherein the reflective particle additives are provided on a surface of the wire grid structure body and/or are provided in an interior of the wire grid structure body, wherein microgrooves located on two opposite sides of the reflective particle additives are formed on a surface of the wire grid structure, and wherein a number of the microgrooves is at least twice of that of the reflective particle additives.

2. The wire grid structure according to claim 1, wherein the reflective particle additives comprise at least one of barium sulfate, titanium dioxide or calcium carbonate; and the wire grid structure body is made of at least one of polyethylene terephthalate, isophthalic acid, cyclohexanedimethanol or polyethylene glycol.

3. The wire grid structure according to claim 1, further comprising:
wire grid bodies connected in sequence, wherein a dimension of the wire grid structure in a height direction ranges from 50 μm to 500 μm, and a dimension of each of the wire grid bodies in the height direction is greater than 0 μm and less than or equal to 200 μm.

4. The wire grid structure according to claim 1, further comprising:
wire grid bodies connected in sequence, wherein each of the wire grid bodies 105 comprises two bottom angles $\theta_1$ and $\theta_2$, wherein the angle $\theta_1$ is 89°, the angle $\theta_2$ falls within a range of 1°-10°.

5. The wire grid structure according to claim 1, wherein air holes located on two opposite sides of the reflective particle additives are formed in an interior of the wire grid structure.

6. The wire grid structure according to claim 5, wherein a number of the air holes is at least twice of that of the reflective particle additives.

7. A projection screen, comprising:
a reflective layer;
an absorbing layer; and
a wire grid structure, wherein the wire grid structure comprises a wire grid structure body and reflective particle additives, wherein the reflective particle additives are provided on a surface of the wire grid structure body and/or are provided in an interior of the wire grid structure body, wherein the wire grid structure body comprises a body surface, projection surface and a non-projection surface that are alternately arranged and opposite to the body surface, the projection surface configured to reflect projection light, the absorbing layer provided on the non-projection surface, and the reflective layer provided on the body surface, wherein microgrooves located on two opposite sides of the reflective particle additives are formed on a surface of the wire grid structure, and wherein a number of the microgrooves is at least twice of that of the reflective particle additives.

8. The projection screen according to claim 7, wherein the wire grid structure further comprises:
wire grid bodies connected in sequence, wherein a dimension of the wire grid structure in a height direction ranges from 50 μm to 500 μm, and a dimension of each of the wire grid bodies in the height direction is greater than 0 μm and less than or equal to 200 μm.

9. The projection screen according to claim 7, wherein the wire grid structure further comprises:
wire grid bodies connected in sequence, wherein each of the wire grid bodies 105 comprises two bottom angles $\theta_1$ and $\theta_2$, wherein the angle $\theta_1$ is 89°, the angle $\theta_2$ falls within a range of 1°-10°.

10. The projection screen according to claim 7, wherein air holes located on two opposite sides of the reflective particle additives are formed in an interior of the wire grid structure.

11. The projection screen according to claim 10, wherein microgrooves located on two opposite sides of the reflective particle additives are formed on a surface of the wire grid structure.

12. A wire grid structure, comprising a wire grid structure body and reflective particle additives, wherein the reflective particle additives are provided on a surface of the wire grid structure body and/or are provided in an interior of the wire grid structure body, wherein air holes located on two opposite sides of the reflective particle additives are formed in an interior of the wire grid structure, and wherein a number of the air holes is at least twice of that of the reflective particle additives.

13. The wire grid structure according to claim 12, wherein microgrooves located on two opposite sides of the reflective particle additives are formed on a surface of the wire grid structure.

14. The wire grid structure according to claim 13, wherein a number of the microgrooves is at least twice of that of the reflective particle additives.

* * * * *